United States Patent
Kunito et al.

(10) Patent No.: US 7,224,277 B2
(45) Date of Patent: May 29, 2007

(54) TAG SELECTOR, TAG SELECTION SYSTEM, AND TAG SELECTION METHOD

(75) Inventors: Goro Kunito, Yokosuka (JP); Kenji Sakamoto, Yokosuka (JP); Kenichi Yamazaki, Hino (JP)

(73) Assignee: NTT DoCoMo, Inc., Tokyo (JP)

( * ) Notice: Subject to any disclaimer, the term of this patent is extended or adjusted under 35 U.S.C. 154(b) by 206 days.

(21) Appl. No.: 10/962,592

(22) Filed: Oct. 13, 2004

(65) Prior Publication Data

US 2005/0103835 A1    May 19, 2005

(30) Foreign Application Priority Data

Nov. 14, 2003   (JP)   ............... 2003-385993

(51) Int. Cl.
   *G08B 13/14*   (2006.01)
(52) U.S. Cl. ................................. 340/572.1
(58) Field of Classification Search ... 340/572.1–572.9
   See application file for complete search history.

(56) References Cited

U.S. PATENT DOCUMENTS

| | | | |
|---|---|---|---|
| 5,920,261 A | 7/1999 | Hughes et al. | 340/572 |
| 7,047,041 B2* | 5/2006 | Vanska et al. | 455/558 |
| 2001/0034565 A1 | 10/2001 | Leatherman | 700/232 |
| 2002/0143860 A1 | 10/2002 | Catan | 709/203 |
| 2003/0095032 A1* | 5/2003 | Hoshino et al. | 340/5.92 |
| 2003/0144926 A1 | 7/2003 | Bodin et al. | 705/28 |
| 2004/0087273 A1* | 5/2004 | Perttila et al. | 455/41.2 |
| 2005/0067486 A1* | 3/2005 | Sansone et al. | 235/380 |

FOREIGN PATENT DOCUMENTS

| | | |
|---|---|---|
| EP | 0 702 323 A2 | 3/1996 |
| JP | 2001-22834 | 1/2001 |
| JP | 2001-249987 | 9/2001 |

* cited by examiner

*Primary Examiner*—Daniel Wu
*Assistant Examiner*—Jennifer Mehmood
(74) *Attorney, Agent, or Firm*—Oblon, Spivak, McClelland, Maier & Neustadt, P.C.

(57) ABSTRACT

When a tag selector 30 receives a plurality of RFID tag IDs detected by an RFID tag reader 10, by a tag ID receiving part 31, it acquires nonspecificities corresponding to these RFID tag IDs from an attribute information DB 41. The tag selector 30 selects an RFID tag ID with a nonspecificity smaller than a predetermined selected tag threshold by a tag ID selecting part 33 and notifies a service determining device 50 of it. A nonspecificity is an index indicating a diversity of use of an article to which a corresponding RFID tag is attached. Therefore, the service determining device 50 determines a service to be provided for the user, based on the RFID tag ID with the low nonspecificity value, whereby it becomes feasible to promptly provide the service very likely desired by the user.

4 Claims, 9 Drawing Sheets

*Fig.2*

| DETECTION TIME | SOURCE READER | RFID TAG ID |
|---|---|---|
| 12:34 | RFID TAG READER 10 | 365185 464670 16610B |
| ⋮ | ⋮ | ⋮ |

Fig.3

| RFID TAG ID | NAME | OWNER | DETECTION SITE | NONSPECIFICITY |
|---|---|---|---|---|
| 365185 | CELL PHONE | USER A | N25'36E141'45 | 11 |
| 464670 | USER A | USER A | N25'37E141'44 | 46 |
| 16610B | BAG | USER A | N25'35E141'46 | 184 |
| ... | ... | ... | ... | ... |

| RFID TAG ID | PROVIDED SERVICE |
|---|---|
| 365185 | LOST ARTICLE NOTIFICATION SERVICE |
| 464670 | NAVIGATION SERVICE |
| 16610B | NEW PRODUCT INTRODUCTION SERVICE |
| ⋮ | ⋮ |

TAG SELECTOR, TAG SELECTION SYSTEM, AND TAG SELECTION METHOD

BACKGROUND OF THE INVENTION

1. Field of the Invention

The present invention relates to a technology of providing services according to IDs of RFID (Radio Frequency Identification) tags detected, for users.

2. Related Background Art

There is a conventional proposed technology of selecting a service suitable for a user holding an article accompanied by an RFID tag, based on an ID of the RFID tag detected by a tag reader, and providing the service for the user. One of such services disclosed is a method of attaching RFID tags with identifiers to various commodities and supporting customer service on the basis of commodities carried into a fitting room by a customer and customer data (cf. Patent Document 1). Another method disclosed is a method wherein RFID tags are attached to books in a library and to users and wherein when a user and a book both are simultaneously off a detection range, it is acknowledged that the user borrows the book and lending of the book is registered (cf. Patent Document 2).

[Patent Document 1] Japanese Patent Application Laid-Open No. 2001-249987

[Patent Document 2] Japanese Patent Application Laid-Open No. 2001-22834

SUMMARY OF THE INVENTION

The above conventional technologies both are based on the assumption that only the RFID tags attached to specific commodities or books are detected in a store or in a library. In practice, however, an RFID tag reader detects all the RFID tags located within its detection range and thus the RFID tags detected are not always those based on the above assumption. For this reason, there is a possibility that a huge number of RFID tags are detected including those associated with services that are not necessarily desired by the user.

In this case, the RFID tag reader is desirably configured to extract an RFID tag necessary for providing a service desired by the user, out of the detected RFID tags. One of conceivable techniques to implement it is such that the RFID tag reader grasps assignment states of all the RFID tag IDs, but this is difficult in practice. Another conceivable technique is such that the RFID tag reader acquires attribute information of all the RFID tags detected. However, the attribute information contains many information items such as dynamic information of an owner, a detection site, and so on. It is thus extremely difficult in terms of data storage capacity or processing performance, for the RFID tag reader, which generally has a small memory capacity, to acquire all the attribute information.

An object of the present invention is therefore to promptly provide a service desired by a user, even in a case where a large number of RFID tags are detected.

In order to achieve the above object, a tag selector according to the present invention comprises selecting means for selecting an ID of a specific RFID tag out of IDs of RFID tags detected by an RFID tag reader, based on attribute information items of the RFID tags. The selecting means may select one or more RFID tag IDs.

According to the present invention, only the RFID tag ID or IDs selected out of the IDs of the detected RFID tags can be used for selection of a service. Accordingly, the number of RFID tag IDs to be used in determination of a service is smaller than in a case where a service is selected by use of IDs of all the RFID tags detected. The selection of the RFID tag ID is carried out based on the attribute information items of the RFID tags detected by the RFID tag reader. For this reason, an attribute of an object to which the RFID tag is attached is reflected in the selection of the service. As a result, it becomes feasible to promptly provide the service desired by the user.

Here the object to which the RFID tag is attached is, for example, an object carried by the user, and may be an object except for the object carried by the user, e.g., an object (e.g., a fitting room) located near the user.

In the tag selector according to the present invention, preferably, the attribute information items are nonspecificities of objects to which the RFID tags are attached, and the selecting means selects the ID of the specific RFID tag out of the IDs of the RFID tags, based on magnitudes of the nonspecificities of the RFID tags.

Here the objects are articles or people to which the RFID tags are attached, regardless of their attributes.

According to the present invention, the "nonspecificities" as indices indicating versatilities or diversities of use of objects to which the RFID tags are attached, are used in the selection of the ID of the RFID tag. Namely, the tag selector performs a comparison among magnitudes of the nonspecificities and, based on the result of this comparison, the tag selector narrows down IDs of RFID tags to be used in the determination of the service, out of the IDs of the RFID tags. For example, the smaller the nonspecificity, the more the usage of the object with the RFID tag is limited; therefore, it becomes easier to specify a service to be provided for the user. Conversely, an RFID tag with a larger nonspecificity has a wider versatility and it becomes more difficult by that degree to estimate a service to be provided. Thus, for example, if an ID of an RFID tag with a nonspecificity smaller than a predetermined threshold is used in the selection of the service, it becomes feasible to provide a service very likely desired by the user. The selection of the service to be provided is carried out only about the RFID tag ID or IDs selected (as narrowed down). For this reason, the service can be promptly provided, when compared with the case where all the RFID tags detected are used as objects.

A tag selection system according to the present invention comprises: an accumulation device for accumulating IDs of RFID tags detected by an RFID tag reader and for transferring the IDs of the RFID tags to a tag selector; a storage device for storing attribute information items of the RFID tags; and the tag selector for selecting an ID of a specific RFID tag out of the IDs of the RFID tags transferred from the accumulation device, based on the attribute information items of the RFID tags acquired from the storage device.

A tag selection method according to the present is invention comprises: an accumulation step wherein an accumulation device accumulates IDs of RFID tags detected by an RFID tag reader; a transfer step wherein the accumulation device transfers the IDs of the RFID tags accumulated in the accumulation step, to a tag selector; an acquisition step wherein the tag selector acquires attribute information items of the RFID tags from a storage device; and a selection step wherein the tag selector selects an ID of a specific RFID tag out of the IDs of the RFID tags transferred in the transfer step, based on the attribute information items of the RFID tags acquired in the acquisition step.

According to the present invention, only the ID of the RFID tag selected out of the IDs of the RFID tags transferred from the accumulation device can be used in the selection of the service. Accordingly, the number of RFID tag IDs to be used in the selection of the service is smaller than in the case where the service is selected using the IDs of all the RFID tags detected. The selection of the ID of the RFID tag is carried out based on the attribute information items of the RFID tags stored in the storage device. For this reason, the attribute of the object to which the RFID tag is attached can be reflected in the selection of the service. As a result, it becomes feasible to promptly provide the service desired by the user.

Here the object to which the RFID tag is attached is, for example, an object carried by the user, but may also be an object except for the object carried by the user, e.g., an object (e.g., a fitting room) located near the user.

In the tag selection system according to the present invention, preferably, the attribute information items are fixed values presenting little change with time, the tag selection system further comprises a cache device for temporarily retaining the fixed values of the RFID tags, and the tag selector selects the ID of the specific RFID tag out of the IDs of the RFID tags transferred from the accumulation device, based on the fixed values of the RFID tags acquired from the cache device.

According to the present invention, a specific effect resulting from the provision of the cache device can be expected in addition to the aforementioned effect of enabling the prompt provision of the service desired by the user. Namely, from the viewpoint of increasing the speed of selection of the RFID tag ID, the attribute information used in the selection of the RFID tag ID is desirably held at a location physically as close to the tag selector as possible. Then, the cache device is made to retain the RFID tag IDs and the fixed values as the attribute information items thereof in correspondence with each other, whereby the tag selector can acquire the attribute information items without need for access to the storage device. Since each attribute information also contains dynamic information such as a name of an object and a current location of an RFID tag, it is difficult to retain all the attribute information items in the cache device. However, since the fixed values are not subject to change with time, it is easy to retain them as attribute information in the cache device. The present invention reduces the time necessary for the selection of the RFID tag ID and achieves speedup of the service provision.

In the tag selection system according to the present invention, the attribute information items may be nonspecificities of objects to which the RFID tags are attached.

According to the present invention, the "nonspecificities" are used in selecting the ID to be used in the determination of the service, out of the IDs of the RFID tags detected. The nonspecificities are fixed values indicating the versatilities or diversities of use of objects to which the RFID tags are attached. In general, the larger the nonspecificity of an RFID tag, the wider the versatility of an object with the RFID tag; therefore, it is difficult to specify a service to be provided for the user. In contrast to it, the smaller the nonspecificity of an RFID tag, the more the versatility of an object with the RFID tag is limited; therefore, it is relatively easy to specify a service to be provided for the user. Consequently, for example, the tag selector preferentially selects an ID of an RFID tag with a small nonspecificity, whereby it becomes feasible to promptly select a service very likely desired by the user.

The present invention enables prompt provision of a service desired by a user, by use of RFID tags.

BRIEF DESCRIPTION OF THE DRAWINGS

FIG. 2 is a diagram showing an example of RFID tag IDs retained in a tag ID accumulation DB.

FIG. 3 is a diagram showing a data storage example inside an attribute information DB.

FIG. 5 is a diagram showing a data storage example inside a provided service DB.

DESCRIPTION OF THE PREFERRED EMBODIMENTS

First Embodiment

Figure 1:
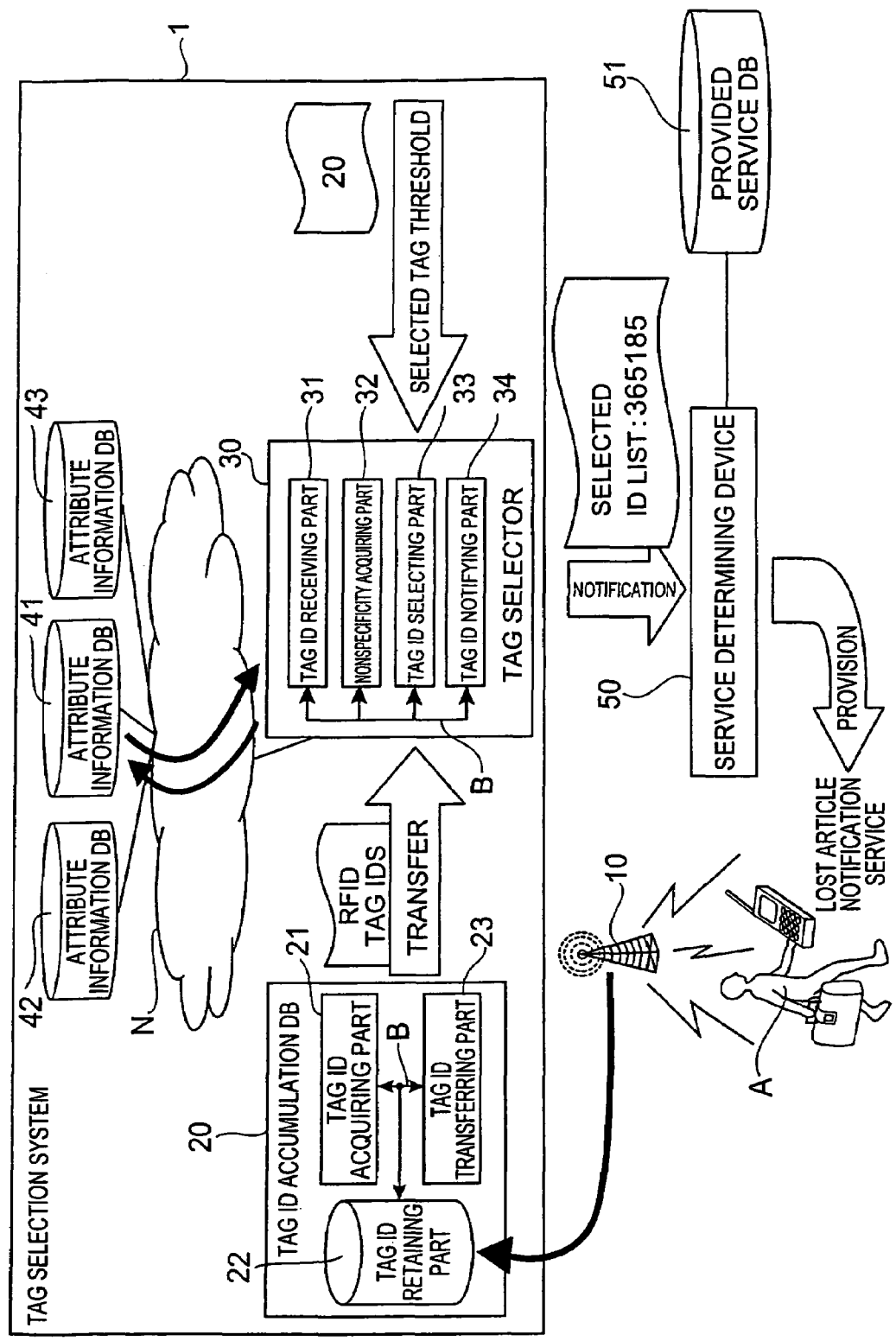
FIG. 1 is an illustration showing a configuration of a tag selection system in the first embodiment of the present invention.

The first embodiment of the present invention will be described below with reference to the accompanying drawings presented for illustrative purposes only. FIG. 1 is an illustration for explaining a configuration of a tag selection system in the present embodiment. As shown in FIG. 1, the tag selection system 1 is comprised of at least a tag ID accumulation DB (DataBase) 20, a tag selector 30, and attribute information DBs 41, 42, and 43. The tag selector 30 and the attribute information DBs 41, 42, 43 are connected so as to be able to communicate with each other through a network N.

The tag ID accumulation DB 20 (corresponding to the accumulation device) is functionally comprised of a tag ID acquiring part 21, a tag ID retaining part 22, and a tag ID transferring part 23. These components are connected through a bus B so as to be able to feed and accept signals to and from each other. The tag ID acquiring part 21 acquires IDs of RFID tags detected by an RFID tag reader 10. The tag ID retaining part 22 retains the IDs of the RFID tags acquired by the tag ID acquiring part 21, in correspondence to their detection time and identification information of the source reader having detected them. FIG. 2 shows a data storage example in the tag ID retaining part 22. The tag ID transferring part 23 transfers the IDs of the RFID tags stored into the tag ID retaining part 22, to the tag selector 30.

Here an ID of an RFID tag is, for example, an RFID (Radio Frequency Identification), and the RFID tag reader 10 may be arbitrarily installed at any place such as an entrance of a store, a ticket gate, an interior of a room, an intersection, and so on. The timing (time) of detection of RFID tag IDs may be determined by the RFID tag reader 10 or by the tag ID accumulation DB 20. Furthermore, the transfer of RFID tag IDs may be carried out in a lump after acquisition of a plurality of RFID tag IDs or may be sequentially carried out at every acquisition of an RFID tag ID.

The tag selector 30 is functionally comprised of a tag ID receiving part 31, a nonspecificity acquiring part 32, a tag ID selecting part 33 (corresponding to the selecting means), and a tag ID notifying part 34. These components are connected through a bus B so as to be able to feed and receive signals to and from each other. The tag ID receiving part 31 receives the RFID tag IDs transferred from the tag ID accumulation DB 20, i.e., IDs of all the RFID tags detected at one time by the RFID tag reader 10. Based on the RFID tag IDs received by the tag ID receiving part 31, the nonspecificity acquiring part 32 acquires nonspecificities corresponding thereto from the attribute information DB 41.

The detailed processing contents will be described later in the description of the operation, but the tag ID selecting part 33 selects an RFID tag ID to be used in selection of a service, by comparing magnitudes of the nonspecificities acquired by the nonspecificity acquiring part 32, and a selected tag threshold (e.g., 20).

The tag ID notifying part 34 notifies a service determining device 50 of the RFID tag ID selected by the tag ID selecting part 33.

The attribute information DB 41 (corresponding to the storage device) stores information about objects to which RFID tags are attached, as attribute information in correspondence to RFID tag IDs. FIG. 3 is a diagram showing an example of data stored inside the attribute information DB 41. As shown in FIG. 3, the attribute information DB 41 has a tag ID area 411, a name area 412, an owner area 413, a detection site area 414, and a nonspecificity area 415.

In the tag ID area 411, information for uniquely identifying each RFID tag (e.g., "365185," "464670," . . . ) is stored as "RFID tag IDs."

Stored in the name area 412 are names of objects to which corresponding RFID tags are attached (in the case of a person, a user ID, a name, or the like). A name of an object may be information indicating a classification of an article such as "cell phone" or "bag," but it is a matter of course that it may contain detailed information such as a maker name, a model name, a part number, or the like.

In the owner area 413, user IDs or names are stored as information capable of uniquely identifying owners of objects to which corresponding RFID tags are attached. Where an object itself is a person, a user ID or name of that person is stored. Since owners can change by virtue of lending and borrowing, or alienation of objects, the data in the owner area 413 is stored in an updatable state.

In the detection site area 414, information indicating locations where the corresponding RFID tags were detected (e.g., N25'36 E141'45, N25'37 E141'44, . . . ) is dynamically stored. How to calculate such location information can be arbitrarily determined. For example, the location information is values calculated by triangulation being a well-known and commonly-used positioning technology, based on latitudes and longitudes of RFID tag readers which are source readers having detected the RFID tags. For example, the location information is values calculated by use of the GPS (Global Positioning System).

Stored in the nonspecificity area 415 are nonspecificities as one of attribute information. Where an object with a corresponding RFID tag is an article, a nonspecificity thereof is a value indicating a diversity of use thereof. Where an object with a corresponding RFID tag is a person, a nonspecificity thereof is a value indicating a multiplicity of RFID tag services under contract. The nonspecificities function as indices for the tag selector 30 to determine which RFID tag ID should be preferentially used out of RFID tag IDs detected.

Figure 4:
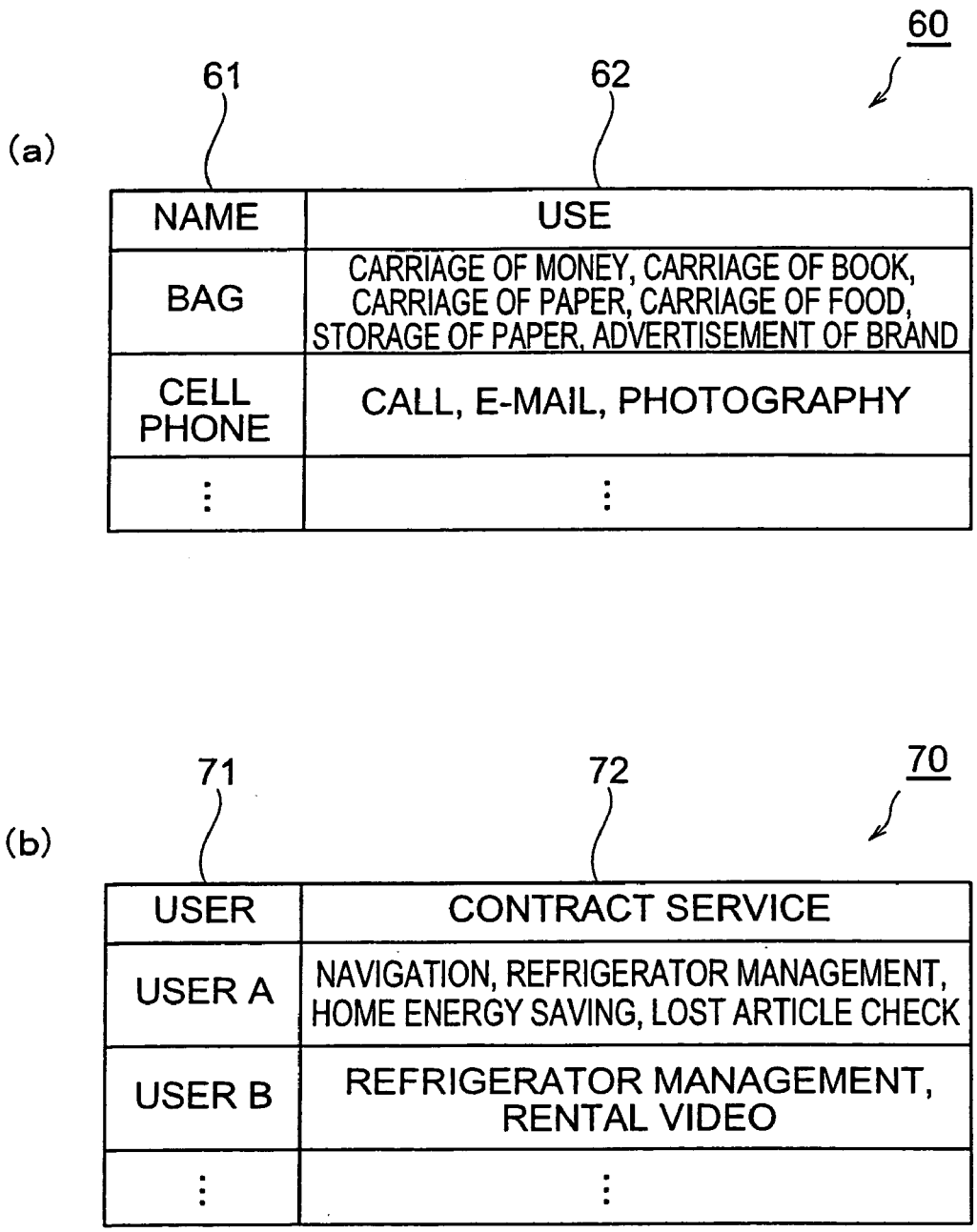
FIG. 4 is a diagram showing a data storage example. (a) is a diagram showing a data storage example inside a use DB, and (b) is a diagram showing a data storage example inside a contract service DB.

The nonspecificities of articles are fixed values set by makers or the like when the articles are manufactured. The nonspecificities of articles can be determined with reference to a use DB 60 shown in FIG. 4(a). As shown in FIG. 4(a), the use DB 60 stores names of articles to which RFID tags are attached, in correspondence to their use. The greater the number of use, the higher the nonspecificity; the smaller the number of use, the lower the nonspecificity. For example, the use of bags is "carriage of money, books, papers, and foods, storage of papers, advertisement of brand," and the use of cell phones "call, e-mail, photography." As described, bags have a wider versatility of use than cell phones, and have higher degree of difficulty in estimating the use desired by the user, so that the nonspecificity of bags is set at a high value (184) as shown in FIG. 3.

Similarly, the nonspecificities of people can be determined with reference to a contract service DB 70 shown in FIG. 4(b). As shown in FIG. 4(b), the contract service DB 70 stores identifiers of people as objects of provision of services, in correspondence to names of contract services. The larger the number of contract service names, the higher the nonspecificity; the smaller the number of contract service names, the lower the nonspecificity. For example, where types of services under contract of a person specified by user A are four types: "navigation, refrigerator management, home energy saving, and check on things left behind," the nonspecificity of the person is "46," as shown in FIG. 3. In contrast to it, the nonspecificity of user B contracting only two types of services is set at a rather low value, e.g., "23," because it is easy to specify a preferred service.

Since the attribute information DBs 42 and 43 have a configuration similar to that of the attribute information DB 41, the description thereof is omitted herein.

The service determining device 50 has a provided service DB 51 a data storage example of which is shown in FIG. 5. When the service determining device 50 acquires an RFID tag ID selected by the tag selector 30, it refers to the provided service DB 51 to determine a service associated with the RFID tag ID, as a provided service. The service thus determined is provided for the user A through a cell phone or the like.

Figure 6:
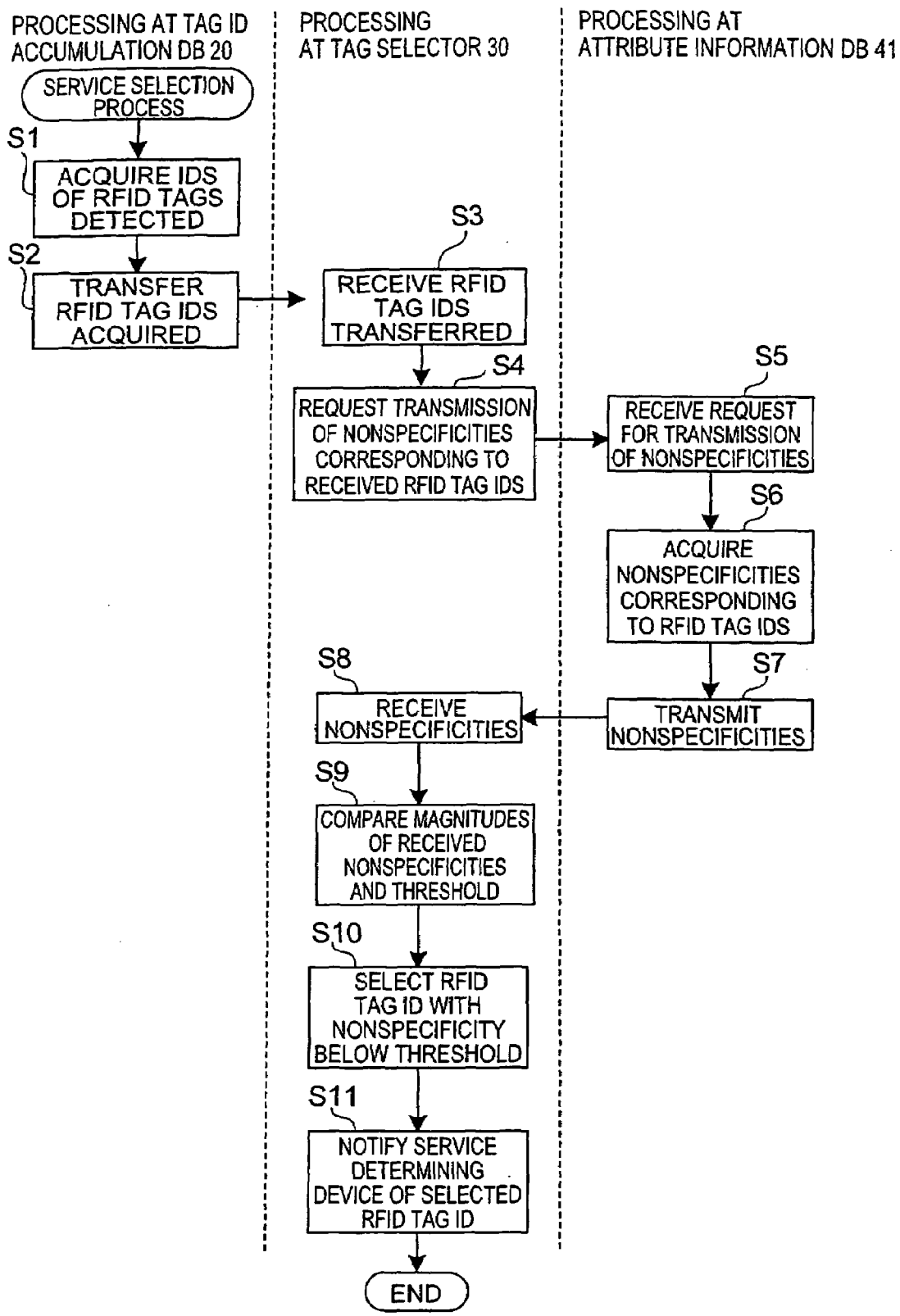
FIG. 6 is a flowchart for explaining an operation of the tag selection system in the first embodiment.

The operation will be described below with reference to the flowchart of FIG. 6. In addition, each of steps forming a tag selection method according to the present invention will be described.

It is premised that the RFID tag reader 10 can detect RFID tags from a plurality of users at one time, but in the description of this operation attention is focused on only the user A and belongings thereof, for simplicity.

First, when the user A goes into the area of the RFID tag reader 10, the tag reader 10 detects RFID tags attached to a cell phone and a bag owned by the user A, and to the user A himself. RFID tag IDs specific to the respective tags are recorded in these RFID tags. The tag ID accumulation DB 20 acquires the IDs of the three RFID tags thus detected, from the RFID tag reader 10 (S1), and then transfers these RFID tag IDs to the tag selector 30 (S2).

At S3 the tag selector 30 receives the RFID tag IDs transferred at S2, by the tag ID receiving part 31. In order to narrow down the RFID tag IDs to be used in the determination of a service, the tag selector 30 requests the attribute information DB 41 to transmit nonspecificities corresponding to the RFID tag IDs (S4). The request contains all the RFID tag IDs acquired at S1.

The attribute information DB 41 receives the request transmitted at S4 (S5), and searches for the nonspecificities corresponding to the RFID tag IDs included in the request, using the RFID tag IDs as keys, to acquire their values (S6). The nonspecificities acquired are sent back to the tag selector 30 (S7). Again referring to FIG. 3, in the present embodiment the RFID tag IDs whose owner is the user A are "365185," "464670," and "16610B," and the nonspecificities corresponding to these IDs are "11," "46," and "184," respectively. Therefore, the values of "11," "46," and "184" are transmitted from the attribute information DB 41 to the tag selector 30.

The tag selector 30 receives the nonspecificities transmitted at S7, by the nonspecificity acquiring part 32 (S8), and then starts execution of an RFID tag selection process which is the major operation of the present invention. Namely, the tag selector 30 makes the tag-ID selecting part 33 compare magnitudes of the nonspecificities and the selected tag threshold (S9), and select an RFID tag ID associated with a nonspecificity smaller than the selected tag threshold (S10).

Here the selected tag threshold used in the selection of RFID tag ID is preliminarily set in the tag selector 30, but this value can also be optionally modified by instructions from the user or by the tag selector 30 as occasion may demand. For example, where "20" is set as the selected tag threshold, the tag ID selecting part 33 compares "11," "46," and "184" of the nonspecificities with "20." In this case, since the nonspecificity smaller than "20" is only "11" among the three nonspecificities, the tag ID selecting part 33 selects the RFID tag ID "365185" corresponding to the nonspecificity of "11."

It is also expected that there are a plurality of nonspecificities smaller than the threshold, depending upon how to set the selected tag threshold. In this case, a plurality of RFID tag IDs are selected. On the other hand, there is also concern that no appropriate RFID tag ID exists because of the too small selected tag threshold. In this case, an RFID tag ID corresponding to the minimum value is selected out of the nonspecificities received at S8.

At S11 the tag selector 30 makes the tag ID notifying part 34 record the RFID tag ID selected at S10, in an ID list and then transmit this list to the service determining device 50. The service determining device 50 refers to the received ID list to determine a service to be provided for the user A, based on the RFID tag ID recorded therein. Such determination of the service is implemented by collating the RFID tag ID with those stored in the provided service DB 51 (cf. FIG. 5). In the present embodiment, since the RFID tag ID of "365185" was selected at S10, the service to be provided for the user A is determined to be "lost article notification service" associated with the ID.

As described above, the RFID tag selection system 1 in the first embodiment focuses attention on an ID of an RFID tag according to a service very likely desired by the user, out of IDs of all the RFID tags detected by the RFID tag reader 10. For that, the RFID tag selection system 1 uses the nonspecificities. Since a nonspecificity is a value indirectly indicating how low is a possibility of agreement between a service desired by the user and a service selected, the probability of providing the service desired by the user, for the user will increase if the service is selected based on an RFID tag ID with a small nonspecificity value. In addition, an RFID tag ID with a larger nonspecificity, i.e., an object with a wider versatility of use is first preferentially eliminated from RFID tag IDs to be used in the selection of the service, which speeds up the service selection process. As a result, it becomes feasible to promptly provide the service for the user.

Second Embodiment

Figure 8:
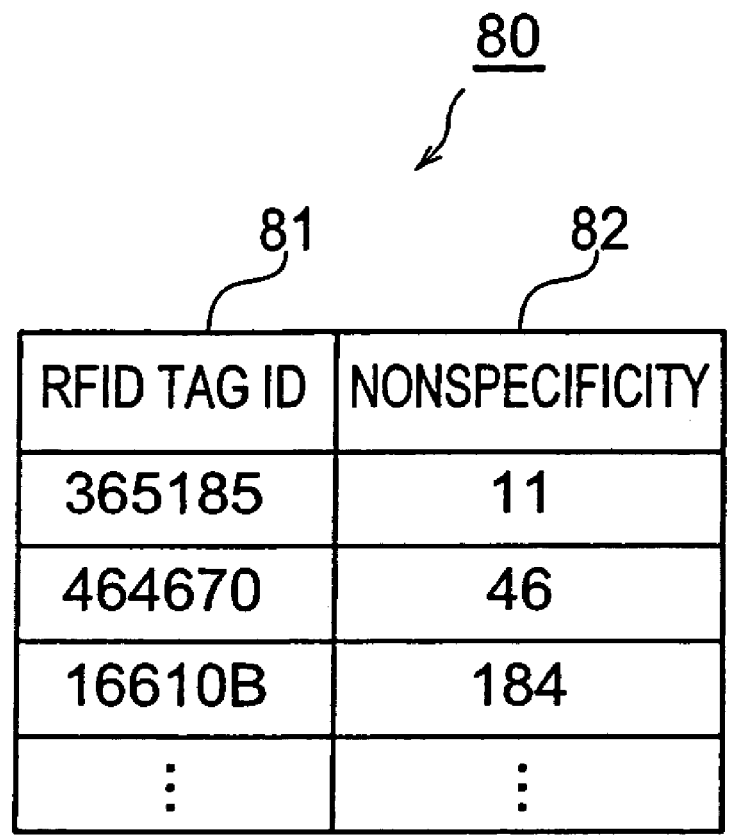
FIG. 8 is a diagram showing a data storage example inside a cache device in the second embodiment.
Figure 9:
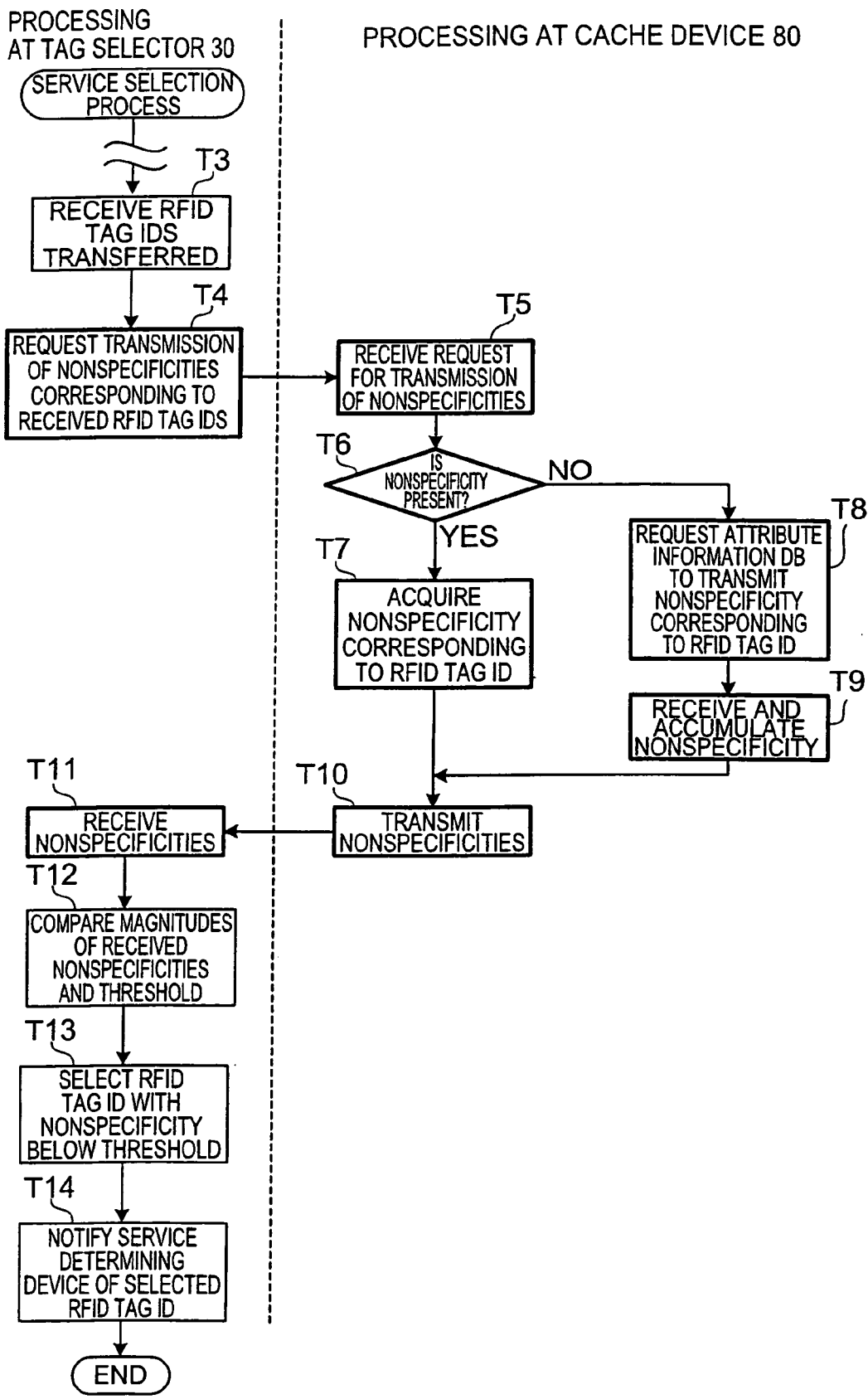
FIG. 9 is a flowchart for explaining an operation of the tag selection system in the second embodiment.

The second embodiment of the present invention will be described with reference to FIGS. 7 to 9. The tag selection system in the second embodiment is different from the first embodiment in that a cache device is provided between the tag selector and the attribute information DBs. Namely, noting that the RFID tag ID can be selected by acquiring only the nonspecificities out of the plurality of attribute information items as described above, the second embodiment is configured to make the cache device retain the correspondence between RFID tag IDs and nonspecificities. This minimizes the number of references for the tag selector to refer to the attribute information DBs as to nonspecificities of identical RFID tag IDs, thereby achieving speedup of processing. The configuration and operation of the system in the present embodiment will be described below.

Figure 7:
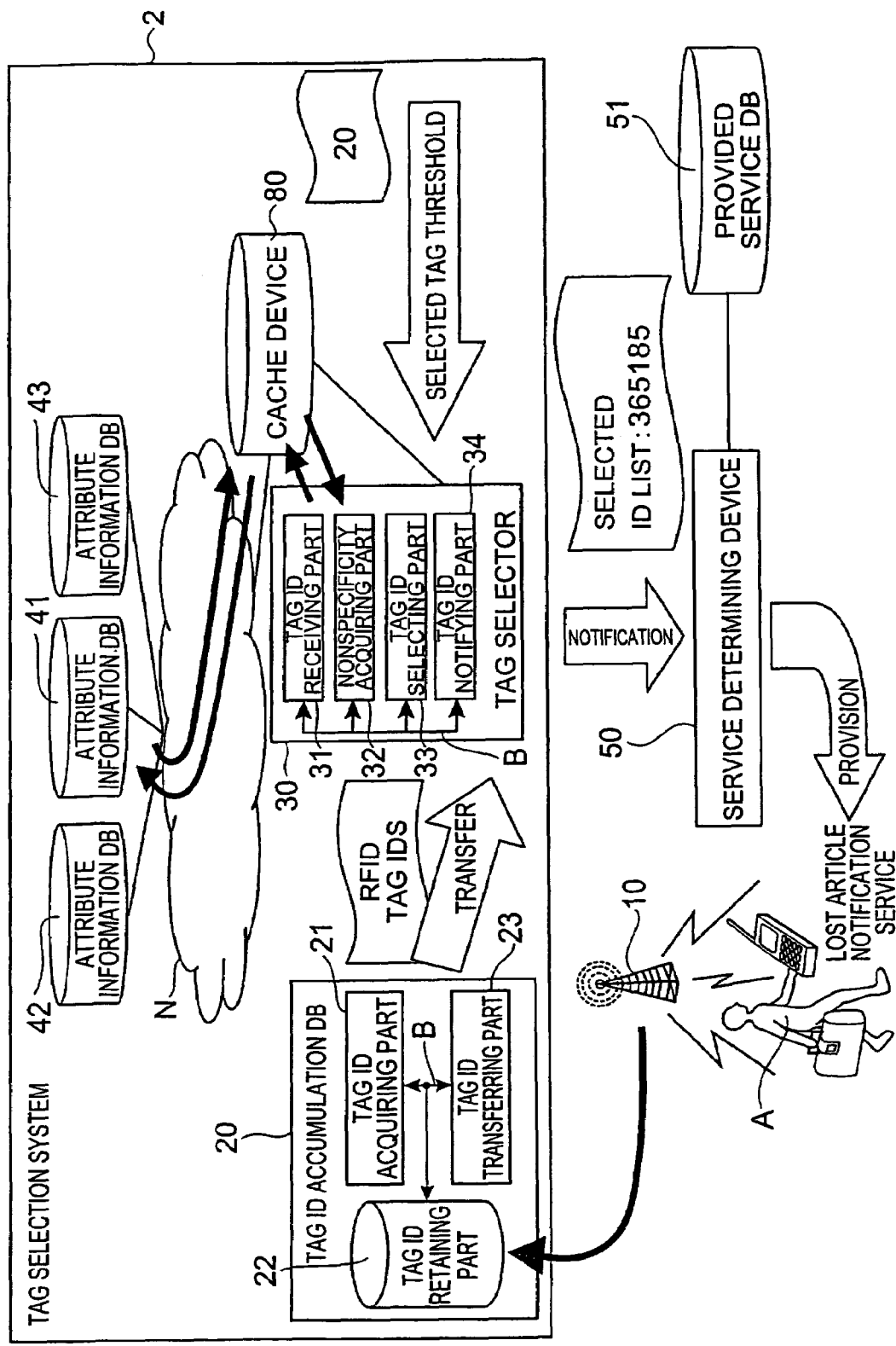
FIG. 7 is an illustration showing a configuration of a tag selection system in the second embodiment of the present invention.

FIG. 7 is an illustration showing a configuration of tag selection system 2 in the second embodiment. As shown in FIG. 7, the configuration of the tag selection system 2 is similar to that of the tag selection system 1 detailed in the first embodiment, except that the tag selection system 2 has a cache device 80. Therefore, the common components will be denoted by the same reference symbols, without description thereof.

Subsequently, the configuration of the cache device 80, which is the difference in structure between the first and second embodiments, will be described below. The cache device 80, as shown in FIG. 8, is comprised of an RFID tag ID storage area 81 and a nonspecificity storage area 82. RFID tag IDs received from the tag selector 30 (e.g., "365185," "464670," "116610B," . . . ) are sequentially registered in the RFID tag ID storage area 81. Nonspecificities (e.g., "11," "46," "184," . . . ) acquired from one of the attribute information DBs 41, 42, 43 on the basis of the corresponding RFID tag IDs are sequentially stored into the nonspecificity storage area 82. In this configuration the cache device 80 enables specification of a nonspecificity based on an RFID tag ID.

The operation of the tag selection system 2 will be described below with reference to FIG. 9. In addition, each of steps forming a tag selection method according to the present invention will be described. The service selection process in the present embodiment includes a plurality of processing contents common to those in the service selection process detailed in the first embodiment (cf. FIG. 6). Specifically, T1–T3 and T12–T14 in FIG. 9 correspond to S1–S3 and S9–S11, respectively, in FIG. 6. T4–T11 (processes in solid blocks), which are processes specific to the present embodiment, will be described below.

First, at T4 the tag selector 30 makes the nonspecificity acquiring part 32 request transmission of the nonspecificities corresponding to the RFID tag IDs received at T3. This request for transmission is not sent to the attribute information DB 41, but to the cache device 80. When the cache device 80 receives the transmission request (T5), it determines the presence or absence of a nonspecificity based on each RFID tag 1D included in the request (T6). Namely, the cache device 80 determines that a corresponding nonspecificity is present for an RFID tag ID previously registered in the RFID tag ID storage area 81, and determines that no corresponding nonspecificity exists for an unregistered RFID tag ID.

Here a nonspecificity acquired from one of the attribute information DBs 41, 42, 43 is stored into the cache device 80 almost simultaneously with registration of each RFID tag ID received from the tag selector 30. For this reason, the cache device 80 is able to determine the presence or absence of a nonspecificity, by determining the presence or absence of registration of each RFID tag ID.

When the result of the determination at T6 is that a nonspecificity corresponding to an RFID tag ID is stored in the cache device 80 (T6; YES), the cache device 80 acquires the nonspecificity from the nonspecificity storage area 82 (T7). In contrast to it, when a nonspecificity corresponding to an RFID tag ID is not stored in the cache device 80 (T6; NO), the cache device 80 refers to the attribute information DB 41 to obtain the nonspecificity (T8). Then the cache device 80 receives the nonspecificity from the attribute information DB 41 through the network N. The nonspecificity thus received is stored in correspondence to the RFID tag ID into the cache device 80, and is used in next and subsequent inquiries about the nonspecificity (T9).

At T10 the cache device 80 transmits the nonspecificities acquired at T7 or received at T9 to the tag selector 30. When the tag selector 30 receives the nonspecificities (T11), it executes the sequential processes of the comparison with the selected tag threshold, and the selection and the notification of an RFID tag ID (T12–T14).

As described above, the following operational effect can be expected by the tag selection system 2 in the second embodiment. Namely, since the cache device 80 is located at the position closer to the tag selector 30 than the attribute information DBs 41, 42, 43, the tag selector 30 is able to acquire the attribute information quickly by use of the cache device 80. However, since the attribute information also contains information of high update frequency such as an owner and a detection site, it is difficult in terms of the processing load due to the data update, to always retain all the attribute information in the cache device 80. In this respect, since the nonspecificities are values presenting little change once determined (fixed values), relative to the other attribute information (owners and detection sites), they have lower necessity for update and it is easy to effectively retain them in the cache device 80. Therefore, it is effective to provide the tag selection system with the cache device 80 and to retain only the nonspecificities as attribute information therein.

Where the nonspecificities are stored in the cache device 80, the tag selector 30 alternatively refers to the cache device 80 to acquire the nonspecificities and is thus able to detect the nonspecificities of RFID tag IDs, without access to the attribute information DBs 41, 42, 43. This decreases the number of access to the attribute information DBs 41, 42, 43 and thus reduces the communication load. The search time for nonspecificities is also reduced, as compared with the case where the tag selector 30 directly refers to one of the attribute information DBs 41, 42, 43 to acquire the nonspecificities. As a result, quick service provision is realized. Even in a case where a nonspecificity is not stored in the cache device 80, the cache device 80 refers to the attribute information DB 41 about the nonspecificity and the tag selector 30 is able to detect the nonspecificity of the RFID tag ID.

The schemes described in the above first and second embodiments are just preferred examples of the tag selection system according to the present invention, and the present invention is by no means intended to be limited to these schemes. For example, the tag selection system was comprised of the tag ID accumulation DB, the tag selector, and the attribute information DBs which were separate components, but these can also be constructed as an integral device having all the functions of the respective devices. It is also possible to adopt a configuration wherein the RFID tag reader has the function of the tag ID accumulation DB. This reduces the communication load between devices. Conversely, it is also effective to implement function distribution by distributing the functions of the individual tag ID accumulation DB, tag selector, and attribute information DBs to other devices, thereby enhancing transparency of position.

In each of the first and second embodiments, it is also possible to use the attribute information of the RFID tags not selected for the service determination, according to need, in execution of the service by a service executing apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A tag selector comprising:
   a tag receiving mechanism configured to receive captured tag indicia corresponding to a plurality of detected RFID tags;
   an attribute information acquiring mechanism configured to receive attribute information items corresponding to captured tag indicia; and
   means for selecting an ID of a specific RFID tag out of IDs of detected RFID tags, based on attribute information items of the RFID tags, the attribute information items including range information indicating the range of utilities of objects associated with the captured RFID tag indicia, and
   wherein, an object corresponding to the selected ID is designated based on the range information.

2. A tag selection system comprising:
   an RFID tag reader configured to capture RFID tag indicia of a plurality of RFID tags;
   an accumulation device configured to accumulate IDs corresponding to the plurality of detected RFID tags for transferring the IDs of the RFID tags to a tag selector;
   a database configured to index tag indicia corresponding to the plurality of RFID tags to attribute information items in the database; and
   the tag selector for selecting an ID of a specific RFID tag out of the IDs of the RFID tags transferred from the accumulation device, based on the attribute information items of the RFID tags acquired from the database, the attribute information items including range information indicating the range of utilities of objects associated with captured RFID tag indicia,
   wherein, an object corresponding to the selected ID is designated based on the range information.

3. The tag selection system according to claim 2, wherein the range information is a fixed value,
   the tag selection system further comprising a cache device for temporarily retaining the fixed values of the RFID tags,
   wherein the tag selector selects the ID of the specific RFID tag out of the IDs of the RFID tags transferred from the accumulation device, based on the fixed values of the RFID tags acquired from the cache device.

4. A tag selection method comprising:
   detecting RFID tag indicia of a plurality of RFID tags;
   accumulating IDs corresponding to the plurality of detected RFID tags at an accumulation device;

transferring from the accumulation device the IDs of the RFID tags accumulated in the accumulation step, to a tag selector;

acquiring at the tag selector attribute information items of the RFID tags from a database; and selecting at the tag selector an ID of a specific RFID tag out of the IDs of the RFID tags transferred, based on the attribute information items of the RFID tags acquired in the acquisition step, the attribute information items including range information indicating the range of utilities of objects associated with captured RFID tag indicia, wherein, an object corresponding to the selected ID is designated based on the range information.

* * * * *